United States Patent [19]

Meyn

[11] 4,023,237
[45] May 17, 1977

[54] APPARATUS FOR CUTTING OUT THE VENT OF A FOWL

[76] Inventor: Pieter Meyn, Noordeinde 72, Oostzaan, Netherlands

[22] Filed: Apr. 23, 1976

[21] Appl. No.: 679,872

[30] Foreign Application Priority Data

Apr. 29, 1975 Netherlands .................. 7505057

[52] U.S. Cl. .................................. 17/11; 17/52; 408/72 B; 408/93
[51] Int. Cl.² ........................................ A22C 21/00
[58] Field of Search ............ 17/11, 52, 45; 408/72, 408/93, 96, 99, 110, 204

[56] References Cited

UNITED STATES PATENTS

| | | | |
|---|---|---|---|
| 2,943,346 | 7/1960 | Jensen | 17/11 |
| 3,147,513 | 9/1964 | Schneider et al. | 17/11 |
| 3,634,908 | 1/1972 | Chamberlain | 17/11 |
| 3,705,440 | 12/1972 | Lewis | 17/11 |
| 3,806,988 | 4/1974 | Harben, Jr. | 17/11 |
| 3,958,302 | 5/1976 | Meyn | 17/11 |
| 3,958,303 | 5/1976 | Scheier et al. | 17/11 |
| 3,975,796 | 8/1976 | LaBarber | 17/45 |

*Primary Examiner*—Russell R. Kinsey
*Assistant Examiner*—Paul J. Hirsch

[57] ABSTRACT

Apparatus for cutting out the vent of a fowl having at least one cutting means, having a hollow cylindrical knife rotating about a center pin, being axially reciprocable relative to the knife and being provided with an onion-shaped knob at its lower end; a clamping sleeve being axially slidable mounted on the center pin with the rotating knife; the relative movements of the center pin, the clamping sleeve and the knife being controlled in such manner that the center pin and the sleeve are first moved together towards the fowl until the center pin, whch protrudes over some distance from the sleeve is inserted into the vent opening and the lower edge of the sleeve contacts the fowl's vent, after which the center pin is drawn into the sleeve, so that the vent is firmly clamped between them, the center pin and the sleeve then are withdrawn over a short distance while the rotating knife is moved towards the fowl and is withdrawn again after cutting out the vent and finally the pin is pushed out of the sleeve again to release the vent.

5 Claims, 3 Drawing Figures

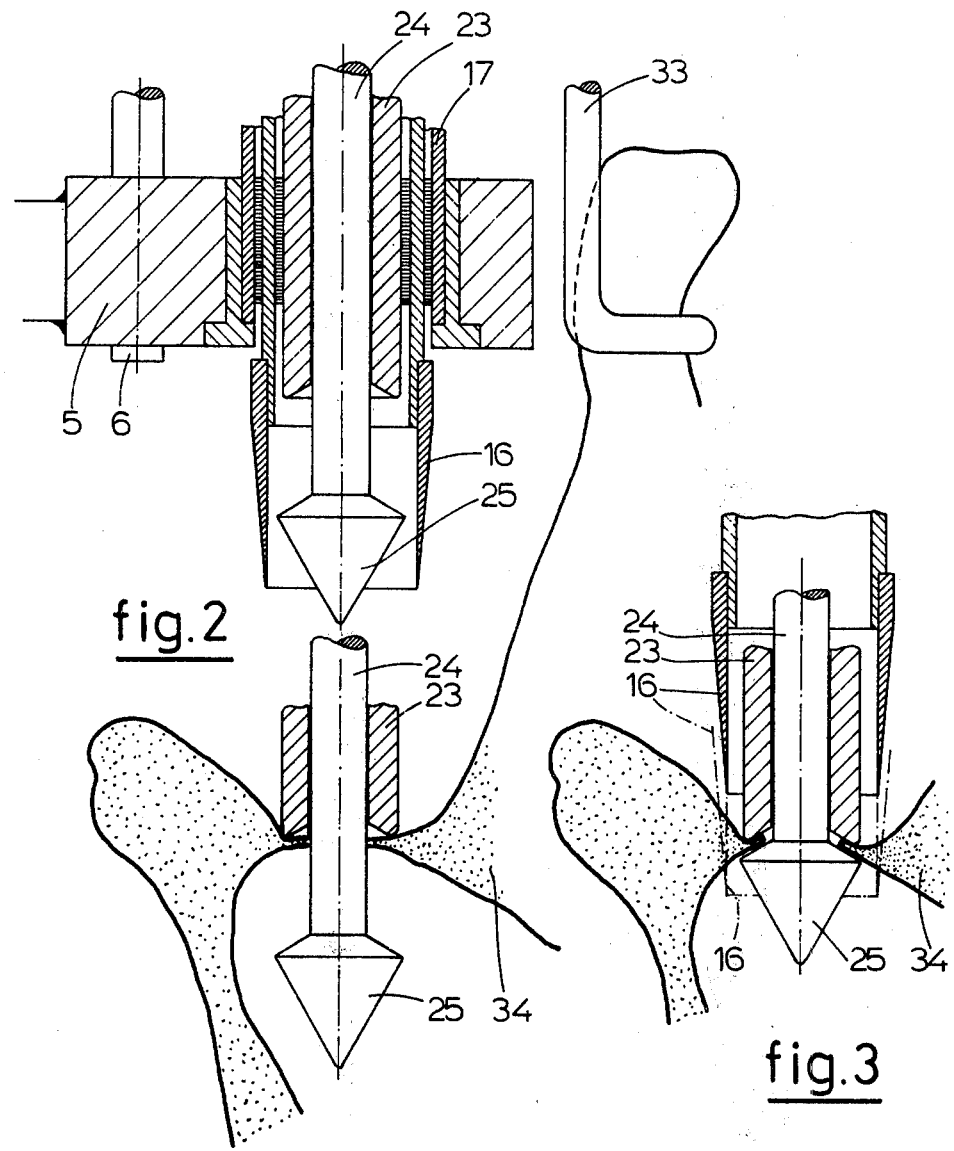

APPARATUS FOR CUTTING OUT THE VENT OF A FOWL

BACKGROUND OF THE INVENTION

The invention relates to an apparatus for cutting out the vent of a fowl, which is hanging by the ankle joints from a hook of an overhead conveyor, comprising at least one cutting means moving along with the conveyor and being provided with a driven hollow cylindrical knife, concentrically rotating about a center pin, which for cutting out the vent is inserted into the vent opening in order to center the knife relative to the fowl's vent.

The known apparatus of this kind which serve to make a circular cut in the skin of the fowl around its vent, in such manner that the skin is severed from the entrails of the fowl, without damaging the entrails, have the disadvantage that the cut out vent is often caught by the rotating knife, so that the fowl's rectum is twisted and might rupture, in which case the entrails are damaged.

BRIEF SUMMARY OF THE INVENTION

It is the object of the invention to overcome the disadvantage hereinbefore described.

According to the invention this object is attained by an apparatus of the kind referred to, having a center pin which is axially reciprocable relative to the knife, is provided with an onion-shaped knob at its lower end and carries an axially slidable clamping sleeve, in such manner that after the center pin is inserted into the fowl's vent opening the vent is gripped between the lower edge and the upper surface of the knob, then cut out by the rotating knife without being caught by the knife and finally released again by the clamping sleeve and the center pin.

Preferably the relative movements of the center pin, the clamping sleeve and the knife are controlled in such manner that the center pin and the sleeve are first moved together towards the fowl until the center pin, which protrudes over some distance from the sleeve is inserted into the vent opening and the lower edge of the sleeve contacts the fowl's vent, after which the center pin is drawn into the sleeve, so that the vent is firmly clamped between them, the center pin and the sleeve then are withdrawn over a short distance while the rotating knife is moved towards the fowl and is withdrawn again after cutting out the vent and finally the pin is pushed out of the sleeve again to release the vent.

Advantageously the clamping sleeve and the rotating knife are each connected to a block slidably mounted on a common guide member, the blocks each having a follower cooperating with a stationary camming track, the shape of which determines the movement of the blocks along the guide member.

Finally it is particularly advantageous if the apparatus is built in the manner of a merry-go-round and is provided with a plurality of cutting means regularly spaced around its circumference.

BRIEF DESCRIPTION OF THE DRAWINGS

Further features and advantages of the invention will become apparent from the following description of an embodiment of the invention taken in connection with the accompanying drawings, in which;

FIGS. 2 and 3 illustrate the operation of the cutting means of the apparatus shown in FIG. 1.

DETAILED DESCRIPTION OF THE PREFERRED EMBODIMENT

Figure 1:
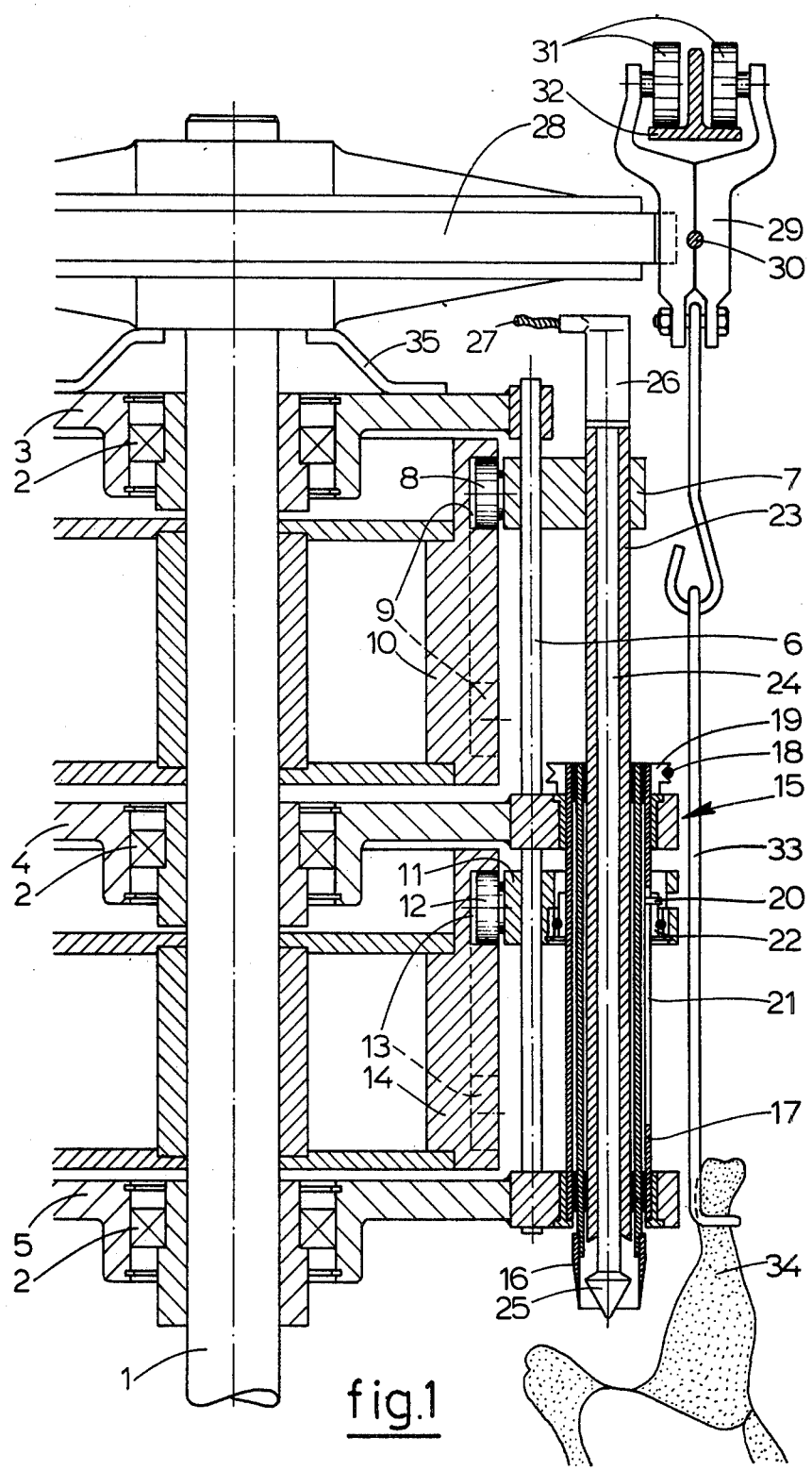
FIG. 1 is a sectional view of a part of an apparatus according to the invention.

The apparatus illustrated in the drawings is built in the manner of a merry-go-round and provided with a central shaft 1, on which by means of bearings 2 three horizontal supports 3, 4 and 5 are rotatably mounted vertically spaced from each other. The supports 3, 4 and 5 are interconnected by means of a plurality of guide members 6 parallel to the central shaft and regularly spaced about the circumference of the apparatus. Between the supports 3 and 4 a first sliding block 7 is slidably mounted on the upper part of each guide member 6, each sliding block 7 being provided with a follower roll 8 facing the shaft 1 and cooperating with a camming track 9 in a cylindrical surface 10 rigidly connected with the shaft 1. Between the supports 4 and 5 a second sliding block 11 is slidably mounted on the lower part of each guide member 6, each sliding block being provided with a follower roll 12, facing the central shaft 1 and cooperating with a camming track 13 in a cylindrical surface 14, rigidly connected with the central shaft 1. The sliding blocks 7 and 11 together support a cutting means 15.

The cutting means 15 comprises a hollow cylindrical rotating knife 16, axially slidable within a driving sleeve 17, the ends of which are rotatably mounted in the supports 4 and 5. The driving sleeve 17 is driven by means of a rope 18 and a rope-pulley 19 attached to the upper end of the sleeve 17. The knife 16 carries a radially extending pin 20, which protrudes into a slot 21 provided in the driving sleeve 17 parallel to the central shaft 1, in such manner that the knife is rotated by the driving sleeve 17 but is axially slidable relative to the sleeve.

The driving sleeve 17 is also rotatably mounted in the lower sliding block 11, whereas the pin 20 is connected with a bearing ring 22 provided in the sliding block 11, in such manner that the pin 20 cannot be moved in parallel with the axis of the knife 16 relative to the sliding block, but is allowed to rotate together with the knife 16 and the sleeve 17.

The clamping sleeve 23 is axially slidable mounted within the hollow knife 16 and near the upper end rigidly connected with the upper sliding block 7. An axially slidable center pin 24 is provided within the clamping sleeve 17, the lower end of which protrudes from the clamping sleeve 17 and is provided with a cone-shaped knob 25. The upper end of the center pin is connected with the piston rod of a pneumatic cylinder 26 attached to the upper end of the clamping sleeve 23. The pneumatic cylinder is connected with a pneumatic control means, not shown, by means of a conduit 27. By means of the pneumatic cylinder 26 the center pin 25 may be reciprocated relative to the clamping sleeve 23.

A driving wheel 28 is rotatably mounted on the upper end of the shaft 1. The outer edge of the driving wheel 28 is provided with recesses for receiving the hangers 29 attached to the pulling cable 30 of the conveyor. Each hanger 29 is provided with rolls 31 supported by a rail 32 being part of the conveyor. Each hanger 29 carries a hook 33 from which a fowl 34 is hanging by the ankle joints. The spacing of the hangers of course corresponds with the spacing of the recesses of the driving wheel 28 as well as with the spacing of the cutting means 15, which each lie directly below one of the recesses of the driving wheel.

The operation of the apparatus described in the foregoing, which serves for cutting out the vent of the fowl 34 carried by the hooks 33 of the conveyor is as follows. A fowl 34 hanging from a hook 33 is carried to the apparatus by the conveyor and the corresponding hanger 29 will be received within one of the recesses of the driving wheel 28, whereafter the fowl and the elements of the cutting means 15 have the relative positions, shown in FIG. 1 and the upper part of FIG. 2. Because the driving wheel 28 is turned by the conveyor and is rigidly connected with the upper support 3 by means of connecting members 35, the guide members 6 will be rotated about the central shaft 1, so that the sliding blocks 7 and 8 will be moved along the guide members 6 as dictated by the shape of the corresponding camming tracks 9 and 30. Starting from the relative positions as shown in FIG. 1, the upper sliding block 7 is first moved down along the corresponding guide member 6, so that the clamping sleeve 23 and the center pin 24 move downwards together, until they reach the position shown in the lower part of FIG. 2 relative to the fowl 34, wherein the knob 25 is inserted into the fowl's vent opening and the lower edge of the clamping sleeve 23 rests on the fowl's vent. Hereafter the pneumatic cylinder 26 is activated, so that the center pin 24 is drawn into the clamping sleeve 23 whereby the vent of the fowl 34 is clamped between the knob of the center pin 24 and the lower edge of the clamping sleeve 23. The clamping sleeve 23 and the center pin 24 are then withdrawn again over a short distance by the sliding block 7 as is shown in FIG. 3, so that the skin of the fowl 34 surrounding its vent is freed from the fowl's entrails. Simultaneously the rotating knife is pushed down along the guide member 6 by the sliding block 11, so that the pin 20 is sliding down within the slot 21 of the rotating driving sleeve 17. Thus the rotating knife 16 will tear the fowl's skin as is shown by dotted lines in FIG. 3, in such manner that the fowl's vent is cut out, without the fowl's entrails being touched by the knife. Because the vent of the fowl 34 is retained by the center pin and the clamping sleeve, it cannot be caught and taken along by the rotating knife 16, so that there is no danger of damaging the fowl's entrails by twisting its rectum.

After the vent is cut out, the knife 16 is withdrawn again by the sliding block 11 as the pneumatic cylinder 26 is activated once more so that the center pin 24 is pushed out of the clamping sleeve 23 again and the vent is released. Finally the clamping sleeve 23 and the center pin 24 are pulled back again together by the sliding block 7, so that the knob 25 of the center pin 24 is withdrawn from the vent opening of the fowl 34. The fowl is then removed from the apparatus by the conveyor for undergoing further treatment.

I claim:

1. Apparatus for cutting out the vent of a fowl, which is hanging by the ankle joints from a hook of an overhead conveyor, comprising a frame, at least one cutting means carried by said frame and means connected with said frame for moving said cutting means along with said conveyor and relative thereto towards and away from said fowl; said cutting means comprising a hollow cylindrical knife mounted for rotation about a center pin, adapted to be inserted into the fowl's vent opening, as the cutting means is moved towards the fowl, for bringing said rotating knife into the right position for cutting out the fowl's vent, and driving means for rotating said knife;

said cutting means further comprising a clamping sleeve slidably mounted on said center pin within said knife, which is axially reciprocable relative to said clamping sleeve and said center pin, which is provided with an onion-shaped knob at its lower end;

and means for controlling the relative movements of said center pin, said clamping sleeve and said rotating knife in such manner that after said center pin is inserted into the fowl's opening the vent is gripped between the lower edge of said clamping sleeve and the upper surface of said knob, then cut out by said rotating knife without being caught by the knife and finally released again by said clamping sleeve and said center pin.

2. Apparatus according to claim 1, wherein the relative movements of said center pin, said clamping sleeve and said rotating knife are controlled by said control means in such manner that said center pin and said sleeve are first moved together towards the fowl until said center pin, which protrudes a predetermined distance from the sleeve is inserted into the vent opening until the lower edge of said sleeve contacts the fowl's vent, after which said center pin is drawn into said sleeve, so that the vent is firmly clamped between them, said center pin and said sleeve then are withdrawn from the fowl a short first distance while said rotating knife is moved towards the fowl to separate the skin around the vent from the fowl's entrails and is withdrawn again after cutting out the vent afterwhich said center pin is pushed out of said sleeve a second distance to release the vent.

3. Apparatus according to claim 2, wherein said control means comprises a pair of sliding blocks slidably mounted on a common guide member, carried by said frame and supporting said clamping sleeve and said rotating knife respectively, said sliding blocks each being provided with a follower roll cooperating with a stationary camming track attached to said frame, the shape of said camming tracks dictating the movement of said sliding blocks along said common guide member.

4. Apparatus according to claim 3, wherein said means for moving said center pin relative to said clamping sleeve comprises a pneumatic cylinder, interconnecting said pin and said sleeve in such manner that said center pin and said clamping sleeve are moved together as a whole when said pneumatic cylinder is not activated.

5. Apparatus according to claim 4, including a plurality of said cutting means regularly spaced about the circumference of a circular support, said support, said follower roll, said guide member and said blocks being mounted about a central shaft.

* * * * *